(12) United States Patent
Kim et al.

(10) Patent No.: US 9,107,097 B2
(45) Date of Patent: Aug. 11, 2015

(54) METHOD AND APPARATUS FOR TRANSMISSION AND RECEPTION OF DATA USING A COMPACT HEADER

(75) Inventors: Jeong Ki Kim, Seoul (KR); Ki Seon Ryu, Sungnam-si (KR); Young Soo Yuk, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 234 days.

(21) Appl. No.: 13/061,502

(22) PCT Filed: Sep. 2, 2009

(86) PCT No.: PCT/KR2009/004939
§ 371 (c)(1),
(2), (4) Date: Feb. 28, 2011

(87) PCT Pub. No.: WO2010/027191
PCT Pub. Date: Mar. 11, 2010

(65) Prior Publication Data
US 2011/0164586 A1    Jul. 7, 2011

Related U.S. Application Data

(60) Provisional application No. 61/093,455, filed on Sep. 2, 2008, provisional application No. 61/093,456, filed on Sep. 2, 2008.

(30) Foreign Application Priority Data

Sep. 19, 2008 (KR) .................. 10-2008-0092425
Oct. 29, 2008 (KR) .................. 10-2008-0106702

(51) Int. Cl.
*H04W 4/00* (2009.01)
*H04W 28/06* (2009.01)
*H04W 72/04* (2009.01)

(52) U.S. Cl.
CPC .............. *H04W 28/06* (2013.01); *H04W 72/04* (2013.01)

(58) Field of Classification Search
CPC ....... H04L 65/00; H04L 29/00; H04L 9/0643; H04L 29/12849
USPC .......................................... 370/329, 392, 328
See application file for complete search history.

(56) References Cited

U.S. PATENT DOCUMENTS

2007/0041378 A1* 2/2007 Ihm et al. .............. 370/389
2007/0091810 A1* 4/2007 Kim et al. ............... 370/236

(Continued)

FOREIGN PATENT DOCUMENTS

| JP | 2003-529290 | 9/2003 |
| JP | 2006-217614 | 8/2006 |
| WO | 2008/097019 | 8/2008 |

*Primary Examiner* — Andrew Chriss
*Assistant Examiner* — Romani Ohri
(74) *Attorney, Agent, or Firm* — Lee, Hong, Degerman, Kang & Waimey

(57) ABSTRACT

The present invention relates to compact header structures of various forms used in wireless access systems as well as a method and apparatus for the transmission and reception of data using such headers. The method for receiving data wherein the mobile terminal uses the Persistent Allocation (PA) mode in one of the embodiments of the present invention comprises the step of receiving a Downlink Persistent Allocation MAP Information Element (DL PA MAP IE) from the base station, which contains information relating to the resource region allocated for persistent allocation in the downlink, and the step of receiving the downlink data containing a Compact Medium access control Header (CMH) via said resource region revealed by said information. At this stage, the CMH can contain an indicator that indicates whether the downlink data contains an extended header, and a length field indicating the length of the data payload.

25 Claims, 21 Drawing Sheets

(56) References Cited

U.S. PATENT DOCUMENTS

| | | | |
|---|---|---|---|
| 2007/0177627 A1* | 8/2007 | Raju et al. | 370/469 |
| 2008/0037540 A1* | 2/2008 | Ngo et al. | 370/392 |
| 2008/0084851 A1* | 4/2008 | Kim et al. | 370/336 |
| 2008/0130590 A1* | 6/2008 | Kim et al. | 370/336 |
| 2009/0034526 A1* | 2/2009 | Ahmadi et al. | 370/392 |
| 2009/0279488 A1* | 11/2009 | Zheng et al. | 370/329 |
| 2010/0135495 A1* | 6/2010 | Chion et al. | 380/273 |

* cited by examiner

FIG. 4

| Hdr type (1) | Com (1) | presence of subheader (4) | EKS(2) | AFP (1) | LEN(7) |
|---|---|---|---|---|---|
| HCS(8)(selective) | | | | | |

| 0 | 1 | 2 | 3 | 4 | 5 | 6 | 7 |
|---|---|---|---|---|---|---|---|
| HT(1) | EC(1) | ESI(1) | \multicolumn{3}{c}{Subheader indicator(3)} | \multicolumn{2}{c}{Rsv(2)} |
| \multicolumn{4}{c}{Flow ID(4)} | Rsv(1) | \multicolumn{3}{c}{Length(3)} |
| \multicolumn{8}{c}{Length(8)} |

FIG. 19

| 0 | 1 | 2 | 3 | 4 | 5 | 6 | 7 |
|---|---|---|---|---|---|---|---|
| HT(1) | \multicolumn{4}{c}{Signaling header type (4)} | \multicolumn{3}{c}{Signaling header body (3)} |
| \multicolumn{8}{c}{Signaling header body (8)} |
| \multicolumn{8}{c}{Signaling header body (8)} |

FIG. 20

| 0 | 1 | 2 | 3 | 4 | 5 | 6 | 7 |
|---|---|---|---|---|---|---|---|
| HT(1) | EC(1) | ESI(1) | Subheader indicator(3) | | | Rsv(2) | |
| Flow ID(4) | | | | Rsv(4) | | | |

(a)

| 0 | 1 | 2 | 3 | 4 | 5 | 6 | 7 |
|---|---|---|---|---|---|---|---|
| HT(1) | EC(1) | ESI(1) | Rsv(1) | Flow ID(4) | | | |

(b)

| 0 | 1 | 2 | 3 | 4 | 5 | 6 | 7 |
|---|---|---|---|---|---|---|---|
| HT(1) | EC(1) | ESI(1) | EKS(1) | Flow ID(4) | | | |

| 0 | 1 | 2 | 3 | 4 | 5 | 6 | 7 |
|---|---|---|---|---|---|---|---|
| HI[=1] | length [>0] ||||||||
| HT[=1] | signaling header type ||| Signaling header body ||||
| Signaling header body ||||||||
| Signaling header body ||||||||

FIG. 24

| 0 | 1 | 2 | 3 | 4 | 5 | 6 | 7 |
|---|---|---|---|---|---|---|---|
| HI | ESI | length ||||||

FIG. 25

| 0 | 1 | 2 | 3 | 4 | 5 | 6 | 7 |
|---|---|---|---|---|---|---|---|
| HI | EKS | length ||||||

FIG. 26

| 0 | 1 | 2 | 3 | 4 | 5 | 6 | 7 |
|---|---|---|---|---|---|---|---|
| HT[=0] | CH[=0] | EC | EST | Rsv | Subheader indicator | | |
| Flow ID | | | | Rsv | length | | |
| length | | | | | | | |

FIG. 27

| 0 | 1 | 2 | 3 | 4 | 5 | 6 | 7 |
|---|---|---|---|---|---|---|---|
| HT[=0] | CH[=1] | length | | | | | |

FIG. 28

| GMH (ESI=1) | ESH 1 (Ext=1) | ESH 2 (Ext=1) | ESH 3 (Ext=0) |
|---|---|---|---|
| payload ||||

FIG. 29

| No.of ESH (2~n) | type (3~n) | ESH body(variable) |
|---|---|---|

FIG. 30

| GMH (SI=1) | No.of ESH [=3] | ESH 1 | ESH 2 | ESH 3 |
|---|---|---|---|---|
| payload |||||

FIG. 31

| 0 | 1 | 2 | 3 | 4 | 5 | 6 | 7 |
|---|---|---|---|---|---|---|---|
| ESI | EKS | \multicolumn{6}{c|}{Length} |

METHOD AND APPARATUS FOR TRANSMISSION AND RECEPTION OF DATA USING A COMPACT HEADER

CROSS-REFERENCE TO RELATED APPLICATIONS

This application is the National Stage filing under 35 U.S.C. 371 of International Application No. PCT/KR2009/004939, filed on Sep. 2, 2009, which claims the benefit of earlier filing date and right of priority to Korean Application Nos. 10-2008-0106702, filed on Oct. 29, 2008, and 10-2008-0092425, filed on Sep. 19, 2008, and also claims the benefit of U.S. Provisional Application Ser. Nos. 61/093,456,filed on Sep. 2, 2008, and 61/093,455, filed on Sep. 2, 2008, the contents of which are incorporated by reference herein in their entirety.

TECHNICAL FIELD

The present invention relates to a wireless access system, and more particularly, to compact header structures of various forms and a method and apparatus for transmission and reception of data to support these compact headers.

BACKGROUND ART

Hereinafter, a header used in a wireless access system will be described in brief.

FIG. 1 is a diagram illustrating an example of a normal medium access control (MAC) header used in a wireless MAN mobile communication system based on an IEEE 802.16 system which is one of a wireless access system.

Referring to FIG. 1, a medium access control protocol data unit (MAC PDD) includes six subheaders together with a generic MAC header (GMH). A subheader per PDU is inserted to the rear of the generic MAC header. Each field included in the generic MAC header will be described below.

A header type (HT) field represents a type of a header for a corresponding PDU. For example, the HT field represents whether a corresponding MAC PDU is either a generic MAC header which includes payload at the rear or a signaling header for control of bandwidth request, etc. An encryption control (EC) field represents encryption control, more particularly represents whether payload has been encrypted. A type field represents the presence of a subheader suffixed next to the header and a type of the subheader. An extended subheader field (ESF) field represents the presence of an enlarged subheader suffixed next to the header.

Also, a CRC indicator (CI) field represents whether CRC is suffixed to the rear of payload. An encryption key sequence (EKS) field represents an encryption key sequence number used for encryption if payload is encrypted. A LENgth (LEN) field represents a length of MAC PDU. A connection identifier (CID) field represents a connection identifier to which MAC PDU is transferred. Connection is used as an identifier of a MAC layer for data or message transfer between a base station and a mobile station. The CID serves to identify a specific mobile station or a specific service between the base station and the mobile station. A header check sequence (HCS) is used to detect an error of the header. In FIG. 1, a number in a parenthesis next to each field name represents bits occupied by each field.

Hereinafter, the CID used in the embodiments of the present invention will be described in brief.

In a mobile communication system, a mobile station (MS) can be classified through a user equipment identifier (UE ID) in 3GPP or connection ID (CID in IEEE 802.16). CIDs are used to identify a mobile station that performs communication with a base station if the base station and the mobile station perform communication through a common channel.

Hereinafter, a CID in a system that supports multiple carriers will be described in brief.

In the IEEE 802.16 which is one of portable Internet and wireless access systems, CID of 16 bits can be used. The CID means an address for classification and identification of connection mapped into a service flow required between peers on a MAC sub layer. At this time, the location of the CID can be indicated by the MAC PDU header.

In the wireless access system, connections between the mobile station and the base station are identified by the CID in the MAC header, wherein the CID can be matched with a service flow identifier (SFID) that defines service QoS parameters related to the CID.

The CID is allocated to each of logical connections, and one base station uses each CID set. Since CID has a length of 16 bits, the base station can use a total of 65536 CIDs. Each of the CIDs can be used depending on its use. Accordingly, predetermined CIDs are previously defined for broadcast control, and the other CIDs can be allocated to the respective mobile stations.

Examples of the CIDs allocated to the mobile stations (MSs) include basic CID, a primary management CID, a plurality of transport CIDs, and a secondary management CID. At present, the mobile communication system prescribes that a total of 16 CIDs can be allocated to one mobile station. In this case, about 4000 mobile stations can be represented by one CID set. If one mobile station has five CIDs, about 13000 mobile stations can be managed by one base station (BS) through the current CID structure.

If persistent and fixed resource regions are used for real time data communication and/or voice communication, the base station and the mobile station transmit and receive data units very frequently. At this time, although headers included in the respective data units have various kinds of information, all kinds of information are not always required.

Accordingly, the present invention is directed to a method and apparatus for transmission and reception of data using compact header, which substantially obviates one or more problems due to limitations and disadvantages of the related art.

An object of the present invention is to provide various header structures and methods for transmitting data for efficient data communication.

Another object of the present invention is to provide a compact MAC header of which size is reduced by classifying functions and uses of CID depending on respective layers (for example, MS ID and flow ID) and using identifiers optimized for each function and use.

Other object of the present invention is to provide a method for identifying each service through a MAC layer even without flow ID used in a compact MAC header and normally transmitting each service from a base station and a mobile station to an upper layer even without corresponding flow ID, whereby the size of the compact MAC header can be more reduced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, the present invention discloses compact header structures of various forms and a method and apparatus for transmission and reception of data to support such headers.

In one aspect according to the first embodiment of the present invention, a method for providing a service using a compressed header comprises the step of receiving a first identifier for identifying service data persistently provided with a predetermined size at a predetermined cycle and an information element (IE) containing information relating to a resource region fixedly allocated for the service data from a base station, the step of storing the first identifier and the information relating to the resource region in a mobile station, and the step of receiving a data unit through the resource region revealed by the information, the data unit including a first header in which a normal header transmitted from the base station is compressed and service data. Also, the method further comprises the step of forwarding the service data transmitted from the base station to an upper layer of the mobile station by using the first identifier.

In the first embodiment, the first header includes a subheader indicator field indicating whether a subheader is included in the data unit, and a length field indicating a size of the data unit. In this case, the first header further includes a field (for example, header check sequence) used to detect its error. At this time, the first header preferably has a size of 1 byte.

In the first embodiment, the first identifier (flow ID) is used to identify service data from a MAC layer after connection between the mobile station and the base station is set, and a second identifier (MS ID) is used to identify the mobile station from a physical layer. Preferably, the size of the first identifier and the size of the second identifier are smaller than that of a generic connection identifier (CID). The first identifier may be a flow ID identifying service from the MAC layer, wherein the flow ID may be referred to as a logical connection identifier (CID).

In the first embodiment, if the mobile station receives the information element (IE) from the base station, the method further comprises the step of transmitting an acknowledgement (ACK) signal to the base station in response to the information element.

In the first embodiment, the information element is transmitted to provide a persistent resource allocation (PRA) method for persistently allocating service data or a group resource allocation (GRA) method for allocating service data by grouping predetermined mobile stations having similar features.

In the first embodiment, the first header includes a subheader indicator field indicating whether an extended subheader is included in the data unit, and a length field indicating a size of the data unit. In this case, the data unit further includes an extended subheader that includes a type field indicating a type of the extended subheader and a body field having a second normal header. At this time, the extended subheader further includes a field indicating whether the data unit further includes another extended subheader other than the extended subheader. The second header may be one of a generic MAC header or signaling header.

Also, the extended subheader further includes a field indicating the number of extended subheaders included in the data unit, and the data unit can include extended subheaders equivalent to those indicated by the field indicating the number of extended subheaders.

In the first embodiment, the first compressed header includes a header indicator field indicating whether a second normal header is included in the data unit and a length field indicating a size of the data unit. The second header may be a generic MAC header or signaling header. Also, the second header includes a first identifier used to identify each service data from the MAC layer after connection between the mobile station and the base station is set. Preferably, the size of the first identifier is smaller than that of the generic CID.

At this time, the second header includes one or more of a type field indicating its type, an encryption control field indicating whether a predetermined data unit has been encrypted, an extended subheader indication field indicating whether the predetermined data unit further includes an extended subheader, a subheader indication field indicating whether the predetermined data unit further includes a subheader, and a length field indicating a size of the predetermined data unit.

Alternatively, the second header may further include one or more of a type field indicating its type, a signaling header type field indicating a type of a signaling header, and a signaling body field.

In the first embodiment, the first header includes a header type field indicating its type, a compressed header field indicating whether the first header has been compressed, and a length field indicating a size of the data unit.

At this time, the first header further includes an encryption control field indicating whether the data unit has been encrypted, a first indication field indicating whether an extended subheader is further included in the data unit, a second indication field indicating information on a subheader, and a first identifier.

In another aspect according to the second embodiment of the present invention, a method for providing service data using a compressed header comprises the step of transmitting a first identifier for identifying service data persistently provided with a predetermined size at a predetermined cycle and an information element (IE) containing information relating to a resource region fixedly allocated for the service data, the step of storing the first identifier and the information relating to the resource region if an ACK signal indicating normal reception is received from the mobile station in response to the information element, and the step of transmitting a first header in which a normal header is compressed and service data to the mobile station through the resource region revealed by the information relating to the resource region if the service is received from an upper layer.

In still another aspect according to the third embodiment of the present invention, a method for receiving data wherein a mobile station uses a persistent allocation (PA) mode comprises the step of receiving a downlink persistent allocation MAP information element (DL PA MAP IE) from a base station, the DL PA MAP IE including information relating to a resource region allocated for the persistent allocation mode in a downlink, and the step of receiving downlink data containing a compact medium access control header (CMH) via said resource region revealed by said information, wherein the CMH includes an indicator (ESI; EH) indicating whether an extended header exists in the downlink data and a length field indicating the length of payload of the downlink data.

If the indicator (for example, EH field or ESI field) is set, the indicator indicates that the extended header is suffixed to the CMH. Preferably, the downlink data is received using a hybrid automatic repeat request (HARQ).

In the third embodiment, the method further comprises the step of transmitting an acknowledgment signal to the base station in response to successful reception of the downlink persistent allocation map information element.

In the third embodiment, the downlink data is voice of Internet protocol (VoIP) data based on the persistent allocation mode.

The downlink persistent allocation map information element further includes a flow identifier for identifying the downlink data, the downlink data being transmitted with a fixed size at a predetermined cycle.

In further still aspect according to the fourth embodiment of the present invention, a method for transmitting data wherein a mobile station uses a persistent allocation (PA) mode comprises the step of receiving an uplink persistent allocation MAP information element (UL PA MAP IE) from a base station, the UL PA MAP IE including information relating to a resource region allocated for the persistent allocation mode in an uplink, and the step of transmitting uplink data containing a compact medium access control header (CMH) via said resource region revealed by said information, wherein the CMH includes an indicator indicating whether an extended header exists in the uplink data and a length field indicating the length of payload of the uplink data. If the indicator (for example, EH field or ESI field) is set, the indicator indicates that the extended header is suffixed to the CMH. In this case, the uplink data is transmitted using a hybrid automatic repeat request (HARQ).

In the fourth embodiment, the base station recognizes that the mobile station normally receives the uplink persistent allocation map information element if the uplink data is received through the uplink resource region allocated for PA.

In the fourth embodiment, the uplink persistent allocation map information element (UL PA MAP IE) further includes a flow identifier for identifying the uplink data, the uplink data being transmitted with a fixed size at a predetermined cycle. Also, the uplink data is voice of Internet protocol (VoIP) data.

In further still another aspect according to the fifth embodiment of the present invention, a method for transmitting data wherein a base station uses a persistent allocation (PA) mode comprises the step of transmitting a downlink persistent allocation MAP information element (DL PA MAP IE) to a mobile station, the DL PA MAP IE including information relating to a resource region allocated for the persistent allocation mode in a downlink, and the step of transmitting downlink data containing a compact medium access control header (CMH) to the mobile station via said resource region revealed by said information, wherein the CMH includes an indicator indicating whether an extended header exists in the downlink data and a length field indicating the length of payload of the downlink data.

In this fifth embodiment, if the indicator (for example, EH field or ESI field) is set, the indicator indicates that the extended header is suffixed to the CMH. In this case, the downlink data is transmitted using a hybrid automatic repeat request (HARQ).

In the fifth embodiment, the method further comprises the step of receiving an acknowledgment signal from the mobile station in response to successful reception of the downlink persistent allocation map information element.

In the fifth embodiment, the downlink persistent allocation map information element (DL PA MAP IE) further includes a flow identifier for identifying the uplink data, the downlink data being transmitted with a fixed size at a predetermined cycle. Also, the uplink data is voice of Internet protocol (VoIP) data.

In further still another aspect according to the sixth embodiment of the present invention, a method for receiving data wherein a base station uses a persistent allocation (PA) mode comprises the step of transmitting an uplink persistent allocation MAP information element (UL PA MAP IE) to a mobile station, the UL PA MAP IE including information relating to a resource region allocated for the persistent allocation mode in an uplink, and the step of receiving uplink data containing a compact medium access control header (CMH) via said resource region revealed by said information, wherein the CMH includes an indicator (ESI; EH) indicating whether an extended header exists in the uplink data and a length field indicating the length of payload of the uplink data.

In the sixth embodiment, if the indicator included in the CMH is set to 1, the indicator indicates that the extended header is suffixed to the CMH. In this case, the uplink data is transmitted using a hybrid automatic repeat request (HARQ).

In the sixth embodiment, the base station recognizes that the mobile station normally receives the uplink persistent allocation map information element if the uplink data is received through the uplink resource region.

In the sixth embodiment, the uplink persistent allocation map information element (UL PA MAP IE) further includes a flow identifier for identifying the uplink data, the uplink data being transmitted with a fixed size at a predetermined cycle. Also, the uplink data is voice of Internet protocol (VoIP) data.

In further still another aspect according to the seventh embodiment of the present invention, a mobile station for transmitting and receiving data using a persistent allocation (PA) mode comprises a receiving module receiving one or more of data and map information element to which the persistent allocation mode is applied, a transmitting module transmitting data to which the persistent allocation mode is applied; and a processor controlling a scheduling service to which the persistent allocation mode is applied.

In this case, the processor performs the step of receiving a persistent allocation MAP information element (PA MAP IE) from a base station, the PA MAP IE including information relating to a resource region allocated for the persistent allocation mode, and the step of receiving or transmitting data containing a compact medium access control header (CMH) via said resource region revealed by said information, wherein the CMH includes an indicator indicating whether an extended header exists in the data and a length field indicating the length of payload of the data. If the indicator is set to 1, the indicator indicates that the extended header is suffixed to the CMH.

In the seventh embodiment, the data is transmitted using a hybrid automatic repeat request (HARQ). The processor further performs the step of transmitting an acknowledgment signal to the base station in response to successful reception of the persistent allocation map information element. In this case, the data is preferably voice of Internet protocol (VoIP) data. Also, the persistent allocation map information element (PA MAP IE) further includes a flow identifier for identifying the data, the data being transmitted with a fixed size at a predetermined cycle.

The first embodiment to the seventh embodiment are only a part of the preferred embodiments of the present invention, and various embodiments reflecting technical features of the present invention will be understood by the person with ordinary skill in the art based on the detailed description of the present invention.

Advantageous Effects

According to the embodiments of the present invention, the following advantages can be obtained.

First of all, it is possible to efficiently perform efficient voice communication and transmit and receive data in accordance with the embodiments of the present invention.

Second, it is possible to reduce overhead occupied by the header during data transmission by using the compact header of various forms disclosed in the embodiments of the present invention.

Third, if a group resource allocation (GRA) method or a persistent resource allocation (PRA) method is used, the base station can allocate the control signal (for example, MAP message), which includes a predetermined resource region and flow ID, to the mobile station. In this case, the mobile station and the base station can share information on predetermined data and transfer the corresponding data to their upper layer even if flow ID on the corresponding data is not included in the compact header.

Fourth, since the compact header of 1 byte size is used, overhead can be reduced by 50%, approximately, as compared with the compact header of 2 byte size.

Finally, since header structures for transmitting normal data to resource regions allocated for GRA or PRA, the mobile station and the base station can support a bandwidth stealing method.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram illustrating an example of a compressed MAC header structure;

FIG. 18 is a diagram illustrating an example of a generic MAC header (GMH) structure that can be used in the embodiments of the present invention;

FIG. 19 is a diagram illustrating an example of a signaling header structure that can be used in the embodiments of the present invention;

FIGs. 20(a) to 20(c) are diagrams illustrating another example of a generic MAC header (GMH) structure that can be used in the embodiments of the present invention;

FIG. 23 is a diagram illustrating still another example of a MAC PDU structure that uses a CMH structure of FIG. 15, in accordance with still another embodiment of the present invention;

FIG. 24 is a diagram illustrating still another example of a compressed header (CMH) structure that can be used in the embodiments of the present invention;

FIG. 25 is a diagram illustrating still another example of a compressed header (CMH) structure that can be used in the embodiments of the present invention;

FIG. 26 is a diagram illustrating still another example of a generic MAC header (GMH) structure that can be used in the embodiments of the present invention;

FIG. 27 is a diagram illustrating still another example of a generic MAC header (GCMH) structure that can be used in the embodiments of the present invention;

FIG. 28 is a diagram illustrating still another example of an extended sub header (ESH) structure in accordance with still another embodiment of the present invention;

FIG. 29 is a diagram illustrating an example of an extended sub header (ESH) configured in a chain type in accordance with still another embodiment of the present invention;

FIG. 30 is a diagram illustrating another example of an extended sub header (ESH) configured in a chain type in accordance with still another embodiment of the present invention;

FIG. 31 is a diagram illustrating still another example of a compressed MAC header (CMH) structure in accordance with still another embodiment of the present invention.

BEST MODE FOR CARRYING OUT THE INVENTION

Figure 1:
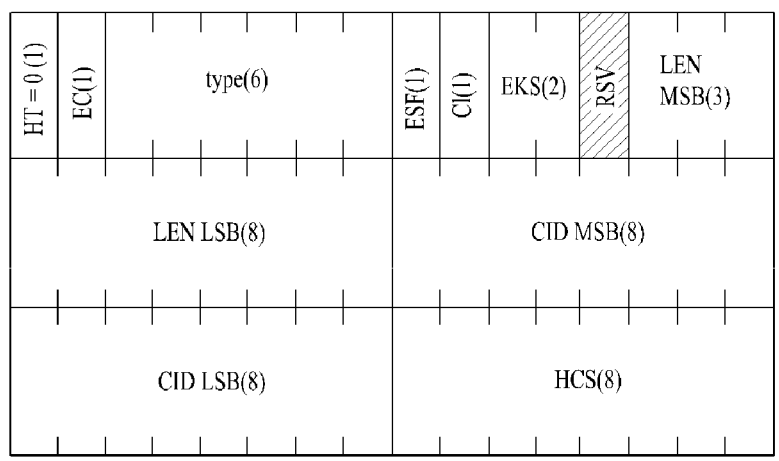
FIG. 1 is a diagram illustrating an example of a normal medium access control (MAC) header used in a wireless MAN mobile communication system based on an IEEE 802.16 system which is one of a wireless access system.

Reference will now be made in detail to the preferred embodiments of the present invention, examples of which are illustrated in the accompanying drawings. Wherever possible, the same reference numbers will be used throughout the drawings to refer to the same or like parts.

The present invention discloses compact header structures of various forms and a method and apparatus for transmission and reception of data to support such headers.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will not be disclosed. Also, procedures or steps that may be understood by the person with ordinary skill in the art will not be disclosed.

In this specification, the embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station (BS) may be replaced with terms such as a fixed station, Node B, eNode B (eNB), an advanced base station (ABS), and an access point (AP). Also, the mobile station may be replaced with terms such as a user equipment (UE), a subscriber station (SS), a mobile subscriber station (MSS), and an advanced mobile station (AMS).

Furthermore, a transmitting side means a node that transmits data services or voice services while a receiving side means a node that receives data services or voice services. Accordingly, in an uplink, the mobile station could be a transmitting side while the base station could be a receiving side. Likewise, in a downlink, the mobile station could be a receiving side while the base station could be a transmitting side.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify the technical features of the present invention can be supported by the above standard documents.

Also, all terminologies disclosed herein can be described by the above standard documents. Particularly, the embodiments of the present invention can be supported by one or more of standard documents of IEEE 802.16 system, i.e., P802.16e-2004, P802.16e-2005, P802.16Rev2, and IEEE P802.16m.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Specific terminologies hereinafter used in the embodiments of the present invention are provided to assist understanding of the present invention, and various modifications can be made in the specific terminologies within the range that they do not depart from technical spirits of the present invention.

For example, a flow identifier (FID) can be replaced with a service flow identifier (SFID) if it performs a function for identifying a service. Also, a data unit represents a transport unit that transmits voice or information, and may have various forms and sizes. The terminology, data unit may be replaced with various terminologies such as MAC PDU and data packet.

Also, in the embodiments of the present invention, an extended subheader may be used to refer to an extended header. Moreover, persistent downlink information element (DL IE) or persistent uplink information element (UL IE) includes resource allocation information for a persistent allocation (PA) method, and can be replaced with various terminologies such as downlink persistent allocation map information element (DL PA MAP IE) or downlink persistent allocation map information element (DL PA MAP IE).

Persistent Resource Allocation (PRA) Method and Group Resource Allocation (GRA) Method Hereinafter, a method for allocating resources for traffic transmitted with a fixed size at a regular cycle, which can be used in the embodiments of the present invention, will be described.

Figure 2:
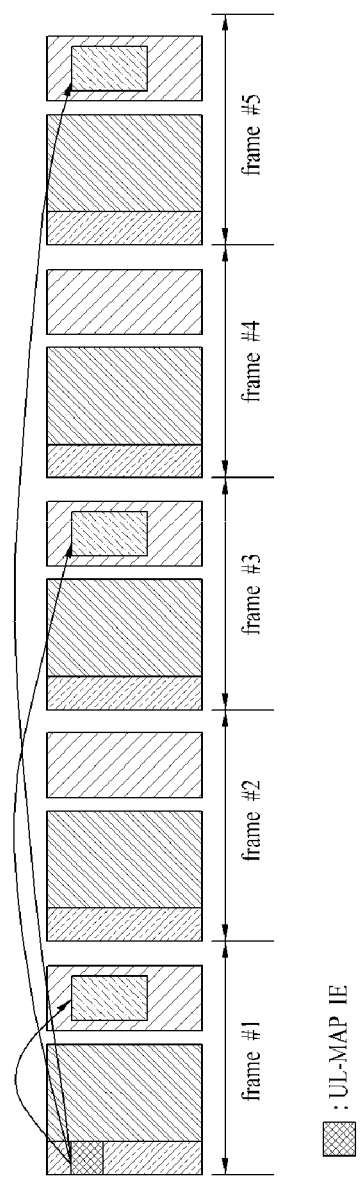
FIG. 2 is a diagram illustrating an example of a persistent resource allocation method.

FIG. 2 is a diagram illustrating an example of a persistent resource allocation method.

Generally, for resource allocation of traffic having a regular cycle of a fixed size such as a voice of Internet protocol (VoIP) service, the base station can fixedly allocate predetermined resource regions to a specific mobile station.

Referring to FIG. 2, for transmission of uplink VoIP service, the base station can allocate a resource region of an initially defined size to the mobile station that supports a VoIP service. Also, the base station can transmit an initial uplink map (UL-MAP) message to the mobile station, wherein the initial uplink map message includes information on the resource region allocated to the mobile station.

The information initially transmitted through the UL-MAP (for example, persistent HARQ UL MAP) can continuously be used by the base station and the mobile station even without resource allocation through another UL-MAP message. Also, the base station can continuously allocate the resource region initially indicated through the UL-MAP message to the mobile station without special notification.

For example, if a map information element (MAP IE) on persistent resource allocation is transmitted from frame #1, the resource region information allocated from the frame #1 can be used for periodical transmission of next frames #3 and #5. In other words, since the map message may not be transmitted repeatedly, map overhead can be reduced.

As a result, the mobile station can transmit VoIP packet to the resource region initially allocated through the UL-MAP message and transmit the VoIP packet to the same resource region at next cycle by using periodic information. The base station can use a persistent HARQ MAP message even when it intends to release the persistent resource allocation region allocated to the mobile station. This method will be referred to as persistent resource allocation (PRA). If the base station allocates the resource region to the mobile station by using the PRA method, resource waste for scheduling can be more reduced than that the map message is transmitted every time.

An example of another scheduling method for a service (for example, VoIP) transmitted at a regular cycle includes a group resource allocation (GRA) method. This GRA method can efficiently use radio resources by managing and scheduling mobile stations having similar features in one group.

In this way, for GRA, the base station can previously notify the mobile station of information required for resource allocation, such as group index, resource allocation cycle, and resource allocation frame offset. As a result, the mobile station can identify the resource allocation timing for data transmission and reception, and can transmit and receive data by using radio resources allocated thereto from the base station through compact resource allocation information.

If the resource region is managed in a group unit, since only one group information (for example, resource allocation size information or MCS information) on same attributes is provided per group, the resources can be more reduced than that the information is transmitted to all mobile stations that belong to the group. The base station can reduce resource waste due to resource allocation position information transfer by previously transmitting the resource allocation position information to the mobile station. At this time, the base station can transmit the resource allocation position information to the mobile station in the form of bit map.

The PRA method used in the embodiments of the present invention may be referred to as a persistent allocation (PA) method. These terminologies PRA and PA designate the same meaning and can be used to be compatible with each other. Also, the GRA method may be referred to as a group allocation (GA) method. These terminologies GRA and GA designate the same meaning and can be used to be compatible with each other.

Figure 3:
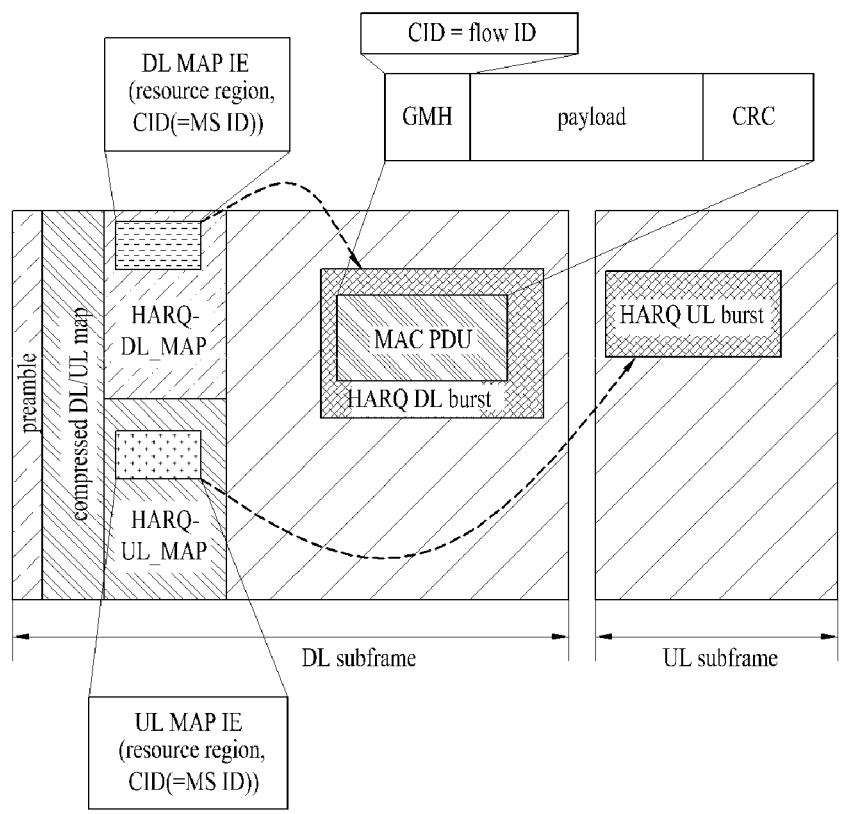
FIG. 3 is a diagram illustrating an example of a frame structure for transmitting a medium access control protocol data unit (MAC PDU)

FIG. 3 is a diagram illustrating an example of a frame structure for transmitting a medium access control protocol data unit (MAC PDU).

Referring to FIG. 3, a preamble is initially allocated from one frame, and a frame control header (FCH) and a compressed DL/UL MAPs are allocated in due order subsequently to the preamble.

At this time, a sub DL/UL map (Sub-DL-UL-MAP), HARQ_DL_MAP or HARQ_UL_MAP is allocated from the compressed DL/UL MAP. In the HARQ DL MAP, DL MAP IE represents resource allocation information on HARQ DL burst. In the HARQ UL MAP, UL MAP IE includes resource allocation information on HARQ UL burst.

The resource allocation information can include CID information representing what mobile station should receive what kind of service. In this case, the CID information can perform the same role as that of a mobile station identifier (MS ID) defined in the IEEE 802.16 SDD. In other words, CID for identifying resource allocation information allocated to the mobile station can be used in the physical layer to identify each mobile station.

The CID may also be used in the MAC layer. In this case, the CID can be used to identify each service for each mobile station. For example, HARQ burst includes a MAC PDU, and a generic MAC header included in the MAC PDU includes CID information representing a service flow to which the MAC PDU currently belongs. At this time, the CID can perform the same role as that of a service flow identifier used in the IEEE 802.16.

As described above, the persistent resource allocation (PRA) method or the group resource allocation (GRA) method is the resource allocation method for a service transmitted with a small size at a regular cycle, such as VoIP. In other words, if the MAC header of 6 bytes as illustrated in FIG. 1 is used for a short packet such as VoIP, overhead of the MAC header is increased. Also, unnecessary information may be used in the MAC header of FIG. 1 even when the PRA method or GRA method is used.

FIG. 4 is a diagram illustrating an example of a compressed MAC header structure.

Referring to FIG. 4, a compressed MAC header structure of 3 byte size can be used for PRA or GRA. At this time, the resource region allocated to the mobile station can continuously be used for a designated service. Accordingly, the base station can skip the CID or service flow ID included in the MAC header during transmission of the corresponding data unit.

In other words, if a length field of the compressed MAC header disclosed in FIG. 4 is transmitted for a short packet such as VoIP, it may be more reduced than that of the GMH. In FIG. 4, the length field (LEN) is set to 7 bits.

However, if flow ID is skipped in FIG. 4, the mobile station and/or the base station cannot transfer corresponding service data to its upper layer directly. Accordingly, a compressed MAC header structure, which can transfer corresponding service data to an upper layer even if a flow ID is skipped and methods for supporting the MAC header will be described.

Compressed MAC Header Structure and Method for Supporting Compressed MAC Header

Figure 5:
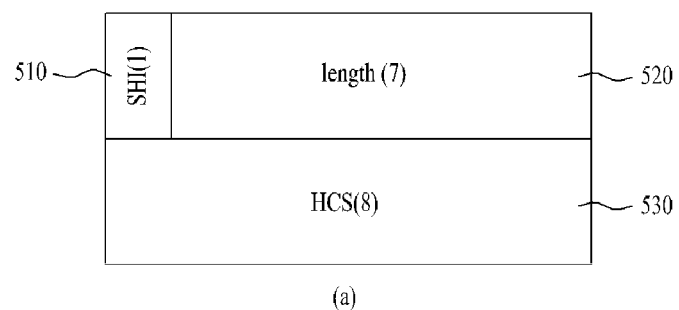
FIGs. 5(a) and 5(b) are diagrams illustrating compressed MAC header structures in accordance with one embodiment of the present invention.
Figure 5:
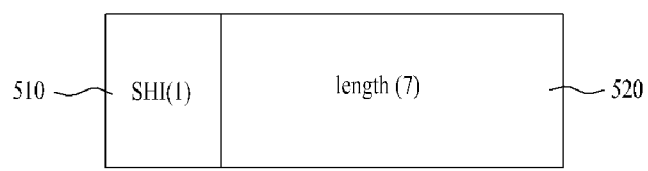

FIG. 5 is a diagram illustrating compressed MAC header structures in accordance with one embodiment of the present invention.

Referring to FIG. 5(a), the compressed MAC header includes a sub header indicator (SHI) field, a length field, and a header control sequence (HCS) field. The SHI field represents whether a sub header is included in a corresponding PDU. Also, a subheader presence field illustrated in FIG. 1 and FIG. 4 or an encryption key sequence (EKS) field may be replaced with the SHI field.

In this case, the SHI field has a size of 1 bit, the length field has a size of 7 bits, and the HCS field has a size of 8 bits. Accordingly, the compressed MAC header of FIG. 5(a) can have a size of 2 bytes. In other words, the compressed MAC header of FIG. 5(a) can have a size smaller than the compressed MAC header of FIG. 4 by 1 byte.

Referring to FIG. 5(b), the MAC header includes the SHI field and the length field only. The HCS field can selectively be used in the embodiments of the present invention. If corresponding data units can be transmitted and received with reliability, the HCS field may not be used. In this case, the compressed MAC header of FIG. 5(b) can have a size smaller than that of the compressed MAC header of FIG. 4 by 2 bytes.

However, in order that the mobile station and/or the base station transmits the MAC PDU, which includes a MAC header having no flow ID (or CID), to an upper layer as illustrated in FIG. 5, the mobile station and the base station should previously have information on the corresponding service and flow ID through negotiation.

To this end, in the embodiments of the present invention, the base station can transmit a MAP message for initial resource allocation, resource allocation change or resource allocation release to the mobile stations to use the PRA method or the GRA method, wherein the MAP message includes flow ID. Accordingly, if the mobile station receives the MAP message, it stores related information (resource allocation region information and flow ID), and transmits the stored information to the upper layer when receiving a data packet in the allocated resource region.

Figure 6:
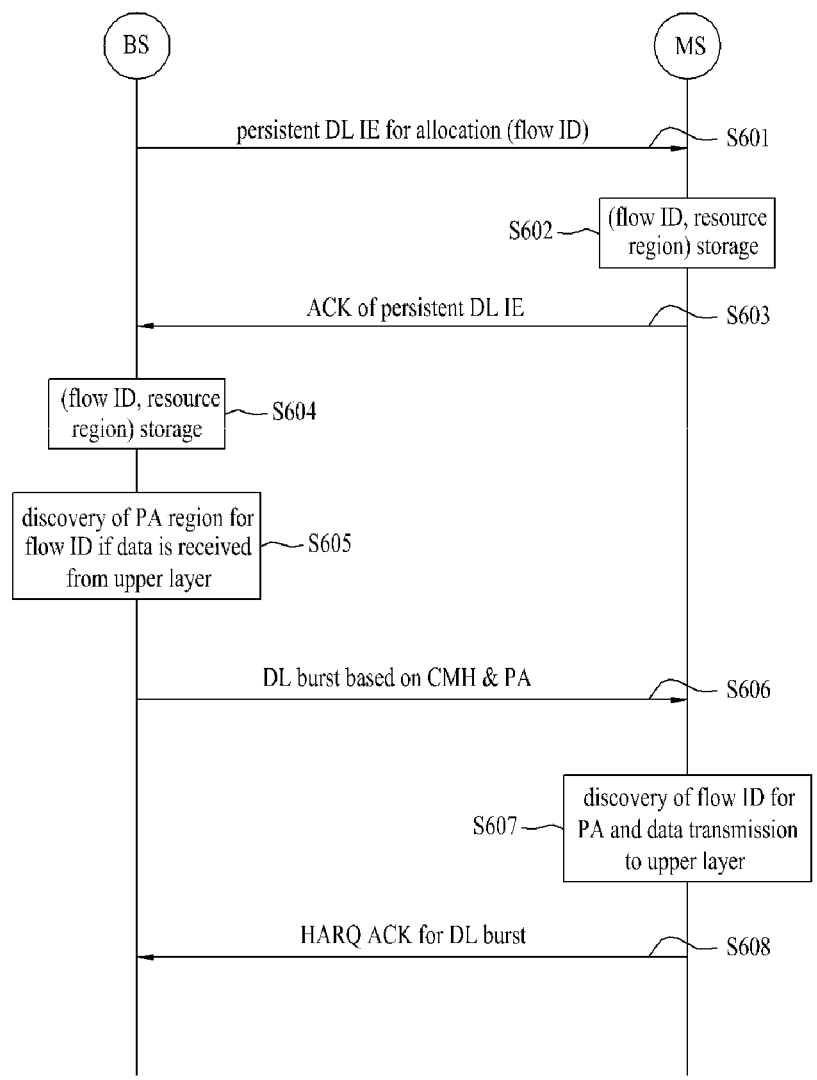
FIG. 6 is a diagram illustrating an example of a method for supporting a compressed MAC header used during downlink data transmission in accordance with another embodiment of the present invention.

FIG. 6 is a diagram illustrating an example of a method for supporting a compact MAC header used during downlink data transmission in accordance with another embodiment of the present invention.

The base station can apply the PRA method to a service for periodically generating a packet, such as VoIP. If the base station transmits downlink traffic to a service in which the PRA method is not enabled, it can transmit a persistent DL IE to the mobile station to enable the PRA method. At this time, the base station can transmit a control signal (for example, persistent DL IE) for persistent resource allocation to the mobile station, wherein the control signal includes a persistent resource allocation region and flow ID (FID) (S601).

If the mobile station receives the persistent DL IE, it can store the flow ID and the resource region information included in the persistent DL IE (S602).

Also, the mobile station can transmit an acknowledgement (ACK) signal on the persistent DL IE to the base station (S603).

If the base station receives the ACK signal on the persistent DL IE, it can store the flow ID and resource region information allocated to the corresponding mobile station (S604).

Since the steps S603 and S604 may selectively be used, they may be skipped depending on user requirements or the communication status. For example, the base station can transmit the persistent DL IE to the mobile station, and can store the resource region information and flow ID included in the corresponding IE even it does not receive ACK. Also, the mobile station may not transmit ACK on the persistent DL IE.

If the base station receives service data related to the PRA from the upper layer, it can discover the persistent resource allocation region mapped into the corresponding flow ID (S605), and can transmit persistent data units to the mobile station through the corresponding resource region by using the compressed MAC header (CMH) (S606).

Preferably, the compressed MAC header described in FIG. 5 is used as the compressed MAC header (CMH) used in the step S606.

If the mobile station receives persistent data burst through the corresponding persistent resource allocation region, it can transmit corresponding data to the upper layer by discovering the flow ID on the persistent resource allocation region (S607).

Also, the mobile station can transmit HARQ ACK on the corresponding downlink burst to the base station (S608).

Figure 7:
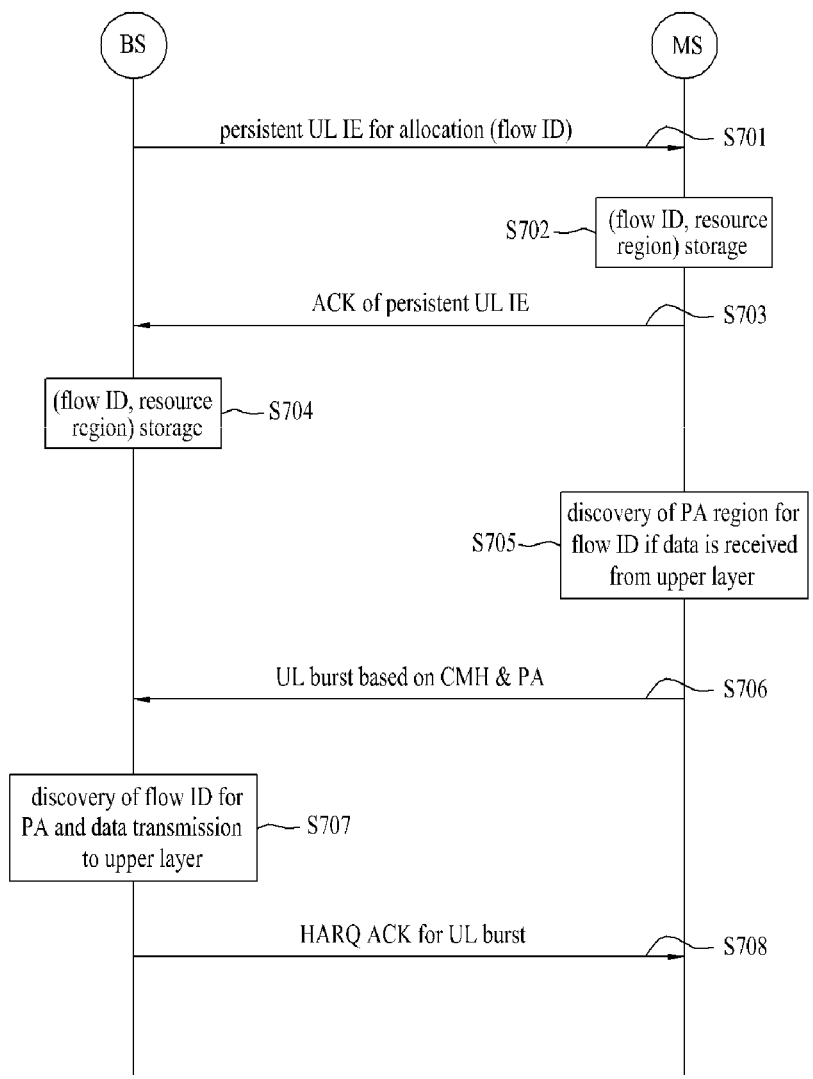
FIG. 7 is a diagram illustrating an example of a method for supporting a compressed MAC header used during uplink data transmission in accordance with still another embodiment of the present invention.

FIG. 7 is a diagram illustrating an example of a method for supporting a compressed MAC header used during uplink data transmission in accordance with still another embodiment of the present invention.

The base station can apply the PRA method to a service for periodically generating a packet, such as VoIP. If the base station is required for uplink resource allocation for a service in which the PRA method is not enabled, it can transmit a persistent UL IE to the mobile station to enable the PRA method. At this time, the base station can transmit a control signal (for example, persistent UL IE) for persistent resource allocation to the mobile station, wherein the control signal includes a persistent resource allocation region and flow ID (FID) (S701).

If the mobile station receives the persistent UL IE, it can store the flow ID and the resource region information included in the persistent UL IE (S702).

Also, the mobile station can transmit an acknowledgement (ACK) signal on the persistent UL IE to the base station (S703).

If the base station receives the ACK signal on the persistent UL IE, it can store the flow ID and resource region information allocated to the corresponding mobile station (S704).

Since the steps S703 and S704 may selectively be used, they may be skipped depending on user requirements or the communication status. For example, the base station can transmit the persistent UL IE to the mobile station, and can store the resource region information and flow ID included in the corresponding IE even it does not receive ACK. Also, the mobile station may not transmit ACK on the persistent UL IE.

If the mobile station receives service data related to the PRA from the upper layer, it can discover the persistent resource allocation region mapped into the corresponding flow ID (S705), and can transmit persistent data units to the base station through the corresponding resource region by using the compressed MAC header (CMH) (S706).

Preferably, the compressed MAC header described in FIG. 5 is used as the compressed MAC header (CMH) used in the step S706.

If the base station receives persistent data burst through the corresponding persistent resource allocation region, it recognizes that the mobile station has normally received the persistent UL IE and transmits corresponding data to the upper layer by discovering the flow ID on the persistent resource allocation region (S707).

Also, the base station can transmit HARQ ACK on the corresponding uplink burst to the mobile station (S708).

Figure 8:
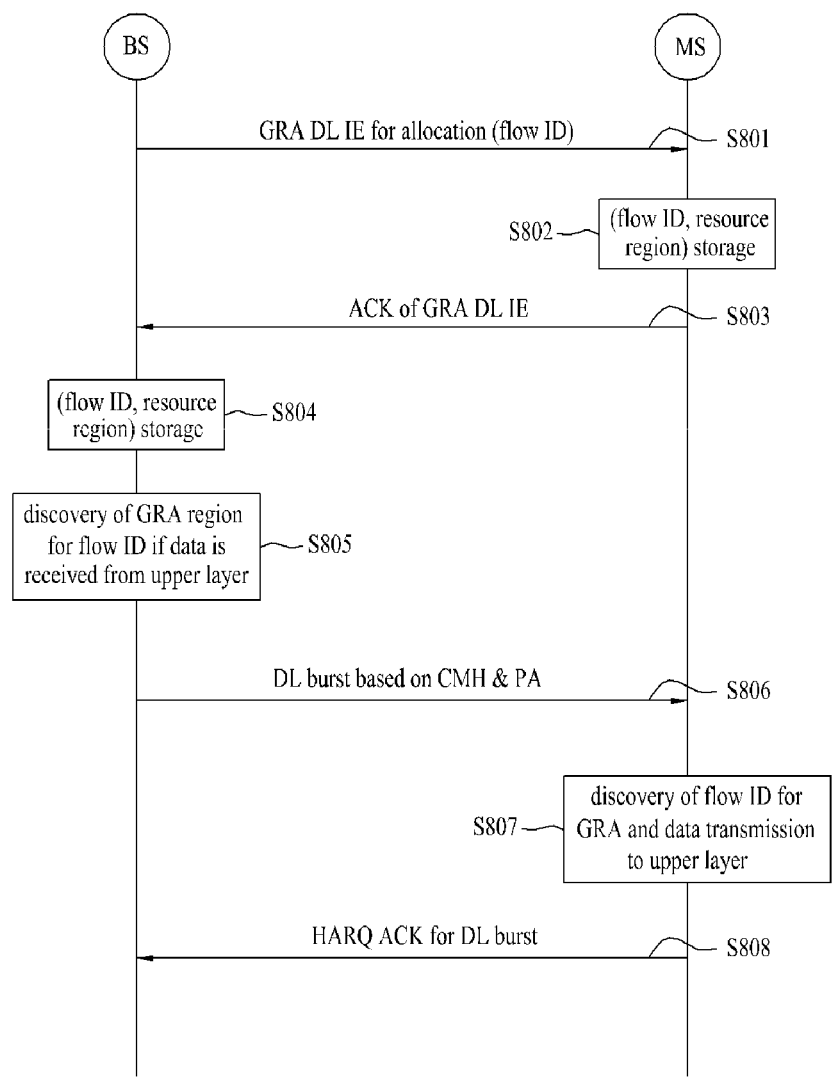
FIG. 8 is a diagram illustrating an example of a method for supporting a group resource allocation (GRA) method used during downlink data transmission in accordance with still another embodiment of the present invention.

FIG. 8 is a diagram illustrating an example of a method for supporting a group resource allocation (GRA) method used during downlink data transmission in accordance with still another embodiment of the present invention.

The base station can apply the GRA method to a service for managing and scheduling similar mobile stations in a predetermined group.

The base station can transmit a DL IE for group resource allocation (GRA) to the mobile station. At this time, the base station can transmit a control signal (for example, GRA DL IE) for group resource allocation to the mobile station, wherein the control signal includes a group allocation resource region and flow ID (FID) (S801).

If the mobile station receives the GRA DL IE, it can store the flow ID and the group allocation resource region information included in the GRA DL IE (S802).

Also, the mobile station can transmit an acknowledgement (ACK) signal on the GRA DL IE to the base station (S803).

If the base station receives the ACK signal on the GRA DL IE, it can store the flow ID and resource region information allocated to the corresponding mobile station (S804).

Since the steps S803 and S804 may selectively be used, they may be skipped depending on user requirements or the communication status. For example, the base station can store the group allocation resource region information and FID included in the GRA DL IE even it does not receive ACK from the mobile station after transmitting the GRA DL IE to the mobile station. Also, the mobile station may not transmit ACK on the GRA DL IE.

If the base station receives service data related to the GRA from the upper layer, it can discover the group allocation resource region mapped into the corresponding flow ID (S805), and can transmit group data units to the mobile station through the corresponding resource region by using the compressed MAC header (CMH) (S806).

Preferably, the compressed MAC header described in FIG. 5 is used as the compressed MAC header (CMH) used in the step S806.

If the mobile station receives group data burst through the corresponding group allocation resource region, it can transmit corresponding data to the upper layer by discovering the flow ID on the group allocation resource region (S807).

Also, the mobile station can transmit HARQ ACK on the corresponding downlink burst to the base station (S808).

Figure 9:
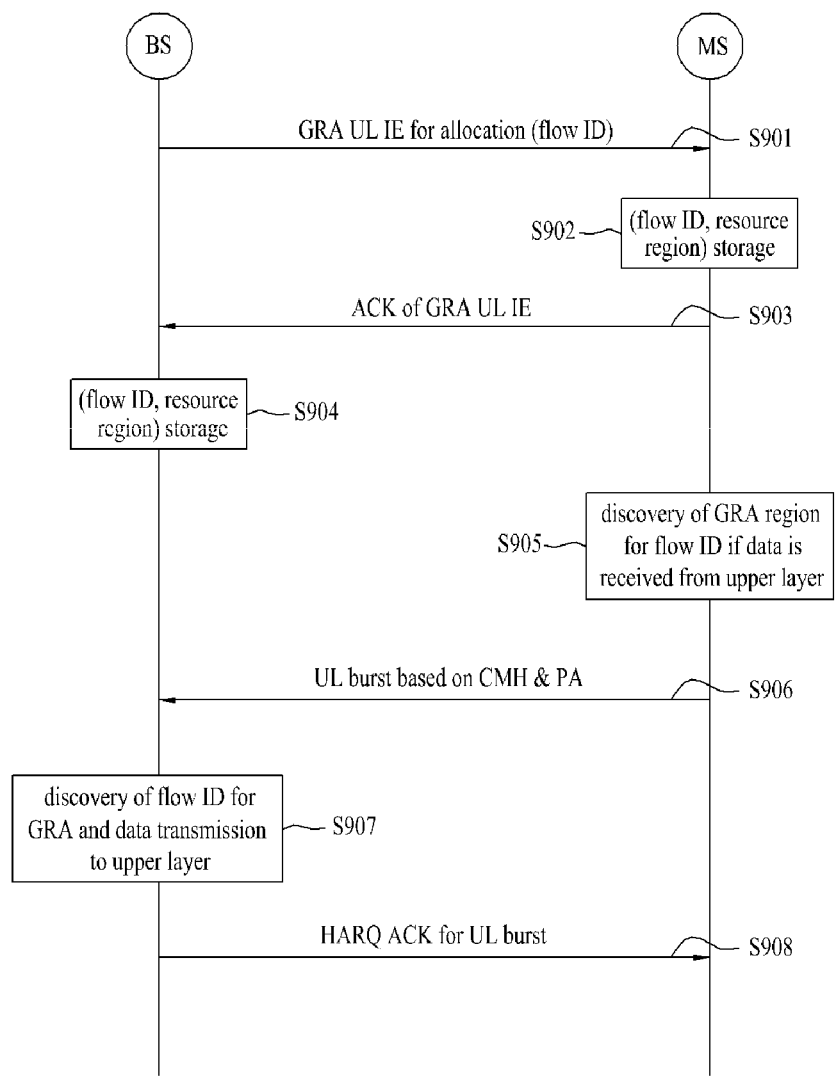
FIG. 9 is a diagram illustrating an example of a method for supporting a group resource allocation (GRA) method used during uplink data transmission in accordance with still another embodiment of the present invention.

FIG. 9 is a diagram illustrating an example of a method for supporting a group resource allocation (GRA) method used during uplink data transmission in accordance with still another embodiment of the present invention.

The base station and/or the mobile station can apply the GRA method to a service for managing and scheduling similar mobile stations in a predetermined group.

The base station can transmit an uplink (UL) IE for group resource allocation (GRA) to the mobile station. At this time, the base station can transmit a control signal (for example, GRA UL IE) for group resource allocation to the mobile station, wherein the control signal includes a group allocation resource region and flow ID (FID) (S901).

If the mobile station receives the GRA UL IE, it can store the flow ID and the group allocation resource region information included in the GRA UL IE (S902).

Also, the mobile station can transmit an acknowledgement (ACK) signal on the GRA UL IE to the base station (S903).

If the base station receives the ACK signal on the GRA UL IE, it can store the flow ID and resource region information allocated to the corresponding mobile station (S904).

Since the steps S903 and S904 may selectively be used, they may be skipped depending on user requirements or the communication status. For example, the base station can store the group allocation resource region information and flow ID included in the GRA UL IE even it does not receive ACK from the mobile station after transmitting the GRA UL IE to the mobile station. Also, the mobile station may not transmit ACK on the GRA UL IE.

If the mobile station receives service data related to the GRA from the upper layer, it can discover the group allocation resource region mapped into the corresponding flow ID (S905), and can transmit group allocation service data and the compressed MAC header (CMH) to the base station through the corresponding resource region (S906).

Preferably, the compressed MAC header described in FIG. 5 is used as the compressed MAC header (CMH) used in the step S906.

If the base station receives persistent data burst through the corresponding group allocation resource region, it can transmit the corresponding data to the upper layer by discovering the flow ID on the persistent resource allocation region (S907).

Also, the base station can transmit HARQ ACK on the corresponding uplink burst to the mobile station (S908).

Method for Transmitting Generic Data Unit Using PRA and GRA

Hereinafter, a method of bandwidth stealing in a base station and/or a mobile station to transmit a data packet (for example, MAC PDU of another service other than a service corresponding to PRA or GRA, signaling MAC header, etc.) through an allocated resource region by using a persistent resource allocation (PRA) method or a group resource allocation (GRA) method will be described.

If the base station allocates a predetermined resource region to the mobile station by using PRA or GRA, the mobile station or the base station can use the allocated resource region to transmit a data unit related to PRA and GRA. However, the compressed MAC header (CMH) is a header defined for PRA or GRA. Accordingly, MAC PDU or signaling MAC header (for example, BR header) for generic data service cannot transmit data by using the CMH defined for PRA or GRA. In this respect, a method for transmitting a generic data unit even if the PRA method or the GRA method is used will be required.

According to another embodiment of the present invention, if a packet transmitter (for example, mobile station and/or base station) intends to transmit another generic data packet or signaling MAC header to the resource region allocated for PRA or GRA, it can transmit it by suffixing the generic MAC header (GMH) or signaling MAC header (SMH) to the CMH.

A receiver (for example, base station and/or mobile station) can decode the GMH or the SMH after decoding the CMH. The transmitter can use the SHI field described in FIG. 5 for the CMH to represent whether another header has been suffixed to the CMH. For example, the SHI field may be set to '1' to represent the presence of the sub header, and a sub header type included in the sub header may be set to the MAC header type. In this case, the transmitter can include a MAC header (GMH or SMH) in a body portion of the sub header.

Figure 10:
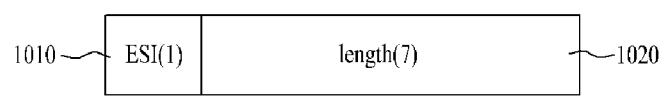
FIG. 10 is a diagram illustrating an example of a compressed MAC header (CMH) structure in accordance with still another embodiment of the present invention.

FIG. 10 is a diagram illustrating an example of a compressed MAC header (CMH) structure in accordance with still another embodiment of the present invention.

Referring to FIG. 10, the compressed MAC header (CMH) includes an extended subheader indication (ESI) field 1010, and a length field 1020. At this time, it is preferable that the ESI field 1010 has a length of 1 bit, and the length field 1020 has a length of 7 bits. The sizes of the ESI field 1010 and the length field 1020 may be varied within the range of a total of 1 byte depending on user requirements or the communication status.

The transmitter and the receiver can perform HARQ during transmission of MAC PDU of PRA and GRA. In this case, since error detection and error correction can be performed through HARQ, HCS of 8 bits may not be used. If the ESI field 1010 is set to '1', the compressed MAC header (CMH) and the extended subheader (ESH) are allocated to a predetermined MAC PDU. In other words, the ESI field can perform a similar function to that of the SHI field of FIG. 5.

Figure 11:
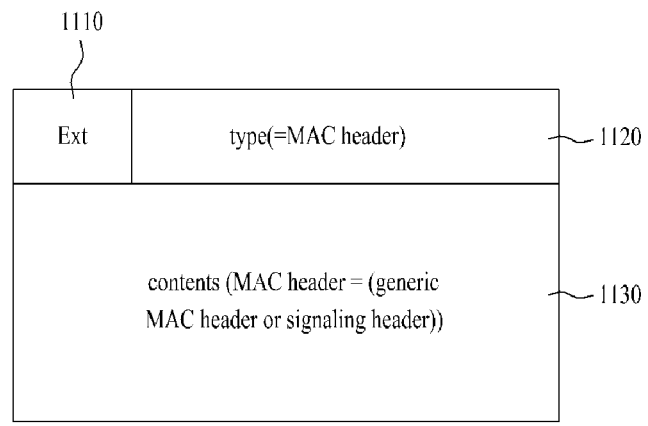
FIG. 11 is a diagram illustrating an example of an extended sub header (ESH) having a generic MAC header (GMH) type in accordance with still another embodiment of the present invention.

FIG. 11 is a diagram illustrating an example of an extended sub header (ESH) having a generic MAC header (GMH) type in accordance with still another embodiment of the present invention.

In order to suffix a normal MAC header to the CMH, in another embodiment of the present invention, an extended subheader type representing the normal MAC header can be defined. Referring to FIG. 11, the extended subheader (ESH) can include a field 1110 (Ext) representing the presence of another extended subheader, an extended subheader type field 1120 (Type) representing a type of the extended subheader, and an extended subheader body field 1130 (ESH body) including contents of the extended subheader. If the header type field indicates the MAC header, the normal MAC header can actually be included in the extended subheader body. At this time, the Ext field represents whether another extended subheader is included, and may be referred to as a next indicator (NI) field.

In FIG. 11, the type field 1120 of the ESH represents the MAC header. Accordingly, the MAC header is included in the body field 1130. At this time, the generic MAC header (GMH) or the signaling MAC header (SMH) may be included in the body field as the MAC header. The ESH structure of FIG. 11 may have a common MAC header type if the size of the GMH is the same as that of the SMH.

Figure 12:
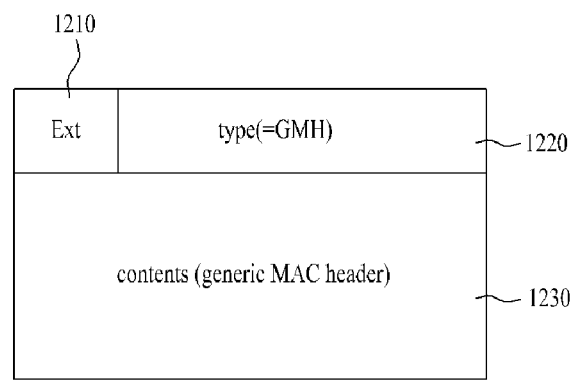
FIGs. 12(a) and 12(b) are diagrams illustrating another example of an extended sub header (ESH) having a generic MAC header (GMH) type in accordance with still another embodiment of the present invention.
Figure 12:
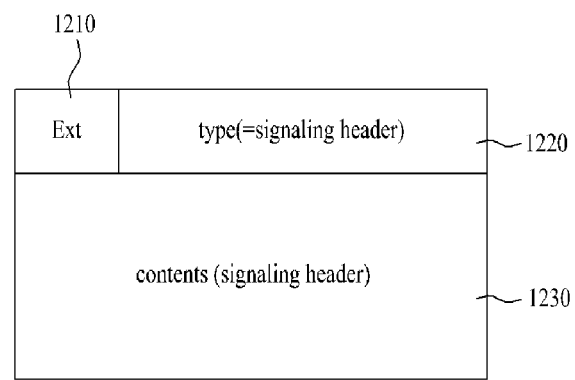

FIG. 12 is a diagram illustrating another example of an extended sub header (ESH) having a generic MAC header (GMH) type in accordance with still another embodiment of the present invention.

If the size of the generic MAC header is different from that of the signaling MAC header in FIG. 11, as illustrated in FIG. 12, the ESH type field having contents of the MAC header should be defined by two types.

Referring to FIG. 12(a), the ESH can include an Ext field 1210, an ESH type field 1220, and an ESH body field 1230. At this time, the type field 1220 represents the general MAC header (GMH), and the body field 1230 can include the GMH.

Referring to FIG. 12(b), the ESH can include an Ext field 1210, an ESH type field 1220, and an ESH body field 1230. At this time, the type field 1220 represents the signaling header, and the body field 1230 can include the signaling header.

Figure 13:
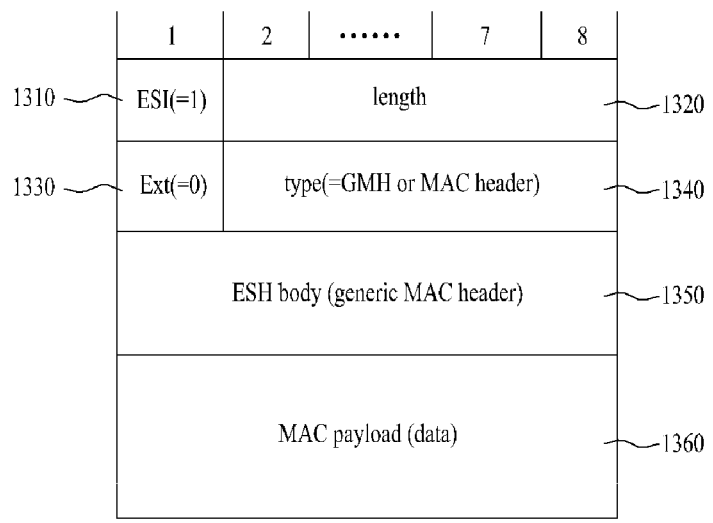
FIG. 13 is a diagram illustrating an example of a MAC PDU structure that includes an extended sub header (ESH) having a generic MAC header (GMH) type at the rear of a compact MAC header (CMH) in accordance with still another embodiment of the present invention.

FIG. 13 is a diagram illustrating an example of a MAC PDU structure that includes an extended sub header (ESH) having a generic MAC header (GMH) type at the rear of a compact MAC header (CMH) in accordance with still another embodiment of the present invention.

Referring to FIG. 13, the MAC PDU can include a CMH, an ESH, and payload. The CMH can include an ESI field 1310 and a length field 1320, and the ESH can include an Ext field 1330, a type field 1340, and an ESH body field 1350. Also, the MAC PDU can further include actual data, i.e., MAC payload 1360.

According to still another embodiment of the present invention, the CMH can have a size of 1 byte, and the ESH can have a size of 2 bytes. If the ESI field 1310 of the CMH is set to '1', it represents that the ESH is suffixed to the CMH. Since the type field 1340 of the ESH represents the GMH, the GMH is allocated to the body field 1350 of the ESH, and then the MAC payload 1360 is allocated thereto.

In other words, if generic data or MAC management message is transmitted to the resource region allocated through PRA or GRA, the GMH is suffixed to the CMH by using the GMH type of the ESH, whereby generic data can be transmitted.

Figure 14:
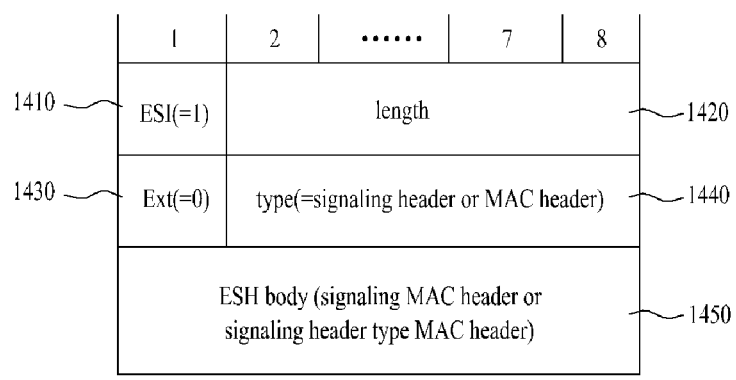
FIG. 14 is a diagram illustrating an example of a MAC PDU structure that includes an extended sub header (ESH) having a signaling header type at the rear of a compact MAC header (CMH) in accordance with still another embodiment of the present invention.

FIG. 14 is a diagram illustrating an example of a MAC PDU structure that includes an extended sub header (ESH) having a signaling header type at the rear of a compact MAC header (CMH) in accordance with still another embodiment of the present invention.

Referring to FIG. 14, the MAC PDU can include a CMH and an ESH. The CMH can include an ESI field 1410 and a length field 1420, and the ESH can include an Ext field 1430, an ESH type field 1440, and an ESH body field 1450. At this time, if the CMH of 1 byte is first allocated and a value of the ESI field 1410 is set to '1' in the CMH, the ESH is suffixed to the CMH. Also, the Ext field and the ESH type field can have a size of 1 byte.

If the Ext field 1430 of the ESH is set to '1', another ESH is not suffixed to the ESH. Since the type field 1440 of the ESH represents the signaling header (or MAC header), the signaling header is allocated to the body field 1450 of the ESH. In other words, if the signaling header is transmitted to the resource region allocated through PRA or GRA, the signaling header is suffixed to the CMH.

The MAC PDU of FIG. 14 does not include a MAC payload. However, the MAC PDU may include a MAC payload depending on user requirements or the communication status.

Figure 15:
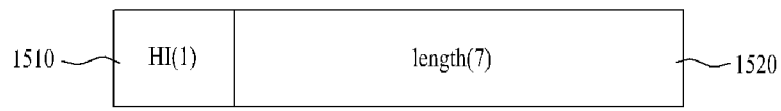
FIG. 15 is a diagram illustrating another example of a compressed MAC header (CMH) in accordance with still another embodiment of the present invention.

FIG. 15 is a diagram illustrating another example of a compressed MAC header (CMH) in accordance with still another embodiment of the present invention.

Referring to FIG. 15, the CMH can include a header indicator (HI) field 1510 and a length field 1520. In this case, the HI field 1510 can have a size of 1 bit, and the length field 1520 can have a size of 7 bits. In other words, it is preferable that the CMH has a size of 1 byte. However, the sizes of the HI field and the length field can be varied within the range of 1 byte.

In FIG. 15, the header indicator (HI) field 1510 represents whether the normal MAC header is suffixed to the CMH. If the HI field 1510 is set to '1', the normal MAC header can be suffixed to the CMH. In this case, the GMH or signaling header can be used as the normal MAC header. The length field 1520 represents the size of the MAC PDU including the CMH.

If the HI field is set to '0', the length field always has a value of 1 or more. If the HI field is set to '1' (for example, HI field includes signaling header and HT field of the MAC header is set to '1'), the length field always has a value of 1 or more. If the HI field is set to '1' and the length field has a value of 0, the GMH including the length field is suffixed to the CMH. If the HI field is set to '1' and the length field has a value of 1 or more, the GMH having no length field is suffixed to the CMH.

Figure 16:
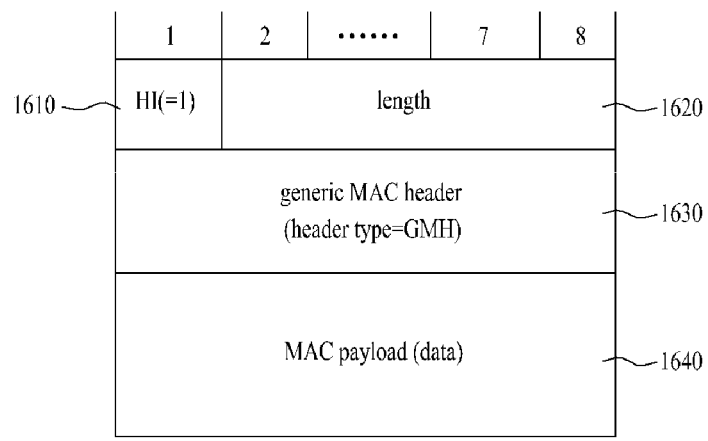
FIG. 16 is a diagram illustrating an example of a MAC PDU structure that uses CMH having HI field, in accordance with still another embodiment of the present invention.

FIG. 16 is a diagram illustrating an example of a MAC PDU structure that uses CMH having HI field, in accordance with still another embodiment of the present invention.

Referring to FIG. 16, the MAC PDU can include a CMH that includes a header indicator (HI) field 1610 and a length field 1620. In this case, if the HI field 1610 is set to '1', it represents that a normal MAC header is suffixed to the CMH. Accordingly, a GMH 1630 is allocated to the MAC PDU as one of the normal MAC header. Also, the MAC PDU can include a MAC payload 1640 included in actual data. The compressed header and the normal header only may be transmitted without the MAC payload included in the MAC PDU of FIG. 16.

Figure 17:
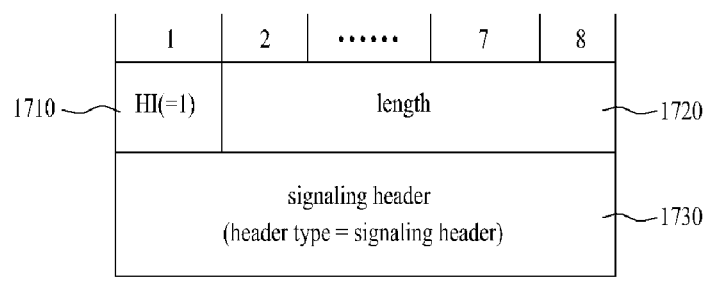
FIG. 17 is a diagram illustrating another example of a MAC PDU structure that uses CMH having HI field, in accordance with still another embodiment of the present invention.

FIG. 17 is a diagram illustrating another example of a MAC PDU structure that uses CMH having HI field, in accordance with still another embodiment of the present invention.

Referring to FIG. 17, the MAC PDU can include a CMH that includes a header indicator (HI) field 1710 and a length field 1720. In this case, if the HI field 1710 is set to '1', it represents that a normal MAC header is suffixed to the CMH. Accordingly, a signaling header 1730 is allocated to the MAC PDU as one of the normal MAC header.

In FIG. 17, no payload is included in the MAC PDU. However, the transmitter can transmit the MAC PDU, which includes a MAC payload, depending on user requirements or the system status.

FIG. 18 is a diagram illustrating an example of a generic MAC header (GMH) structure that can be used in the embodiments of the present invention.

Referring to FIG. 18, the GMH can include a header type (HT) field representing a type of the header, an encryption control (EC) field representing whether the MAC PDU has been encrypted, an extended subheader indication (ESI) field representing whether the extended subheader has been allocated, a subheader indicator field representing whether the subheader is included and representing an allocation mode of the subheader, a flow ID for identifying services allocated from the MAC layer to a specific mobile station, and a length field representing the size of the MAC PDU. At this time, a number marked in a parenthesis next to each field is a bit unit to represent a size of the corresponding field.

In FIG. 18, the HT field represents a type of a header included in the MAC PDU, and further represents whether the corresponding header is a generic MAC header (GMH) or signaling header. It is assumed that the GMH is illustrated in FIG. 18.

The subheader indicator has a size of 3 bits and represents whether the subheader is suffixed to the GMH. For example, Bit #0 represents a fast feedback subheader (GMSH) for the DL and a grant management subheader (GMSH) for the UL. Bit #1 and Bit #2 can represent fragmentation, packing and/or extended packing subheader. For example, 00 can represent fragmentation, 01 packing, 10 extended packing, and 11 reserved value. Of course, the definition of the corresponding bits may be varied.

FIG. 19 is a diagram illustrating an example of a signaling header structure that can be used in the embodiments of the present invention.

Referring to FIG. 17, the signaling header can include a header type (HT) field, a signaling header type field and a signaling header body field.

In FIG. 19, a number in a parenthesis of each field is a bit unit to represent a size of the corresponding field. In FIG. 19, the size of each field may be varied, and the signaling header type field may have a size of minimum 4 bits and maximum 7 bits. Also, the signaling header body field may have a size within the range of 8 bits to 16 bits.

In FIG. 19, the HT field can represent the signaling header. The contents included in the signaling header body field may be varied depending on the type of the signaling header represented by the signaling header type field.

FIG. 20 is a diagram illustrating another example of a generic MAC header (GMH) structure that can be used in the embodiments of the present invention.

If the GMH is suffixed to the CMH in FIG. 15, the GMH structure of FIG. 18 can be used as it is. In this case, the length portion of CMH may be repeated with that of the GMH. Accordingly, FIG. 20 discloses a method for representing a GMH type field subheader by using a length field of a CMH.

For example, if the length field of the CMH is set to '0', the GMH suffixed to the CMH necessarily includes a length field as illustrated in FIG. 18, and the length field of the GMH can represent a length of other data (for example, subheader, ESH, MAC payload, etc.) included in the MAC PDU.

However, if the length field of the CMH is set to '1' or more, the GMH having no length field is suffixed to the CMH, and the length field of the CMH can represent a length of other data and the GMH.

FIG. 20 illustrates examples of the GMH subheader structure having no length field if the length field of the CMH includes information of the GMH. Referring to FIG. 20(a), the GMH can include one or more of a header type (HT) field representing a type of the header, an encryption control (EC) field representing whether the MAC PDU has been encrypted, an extended subheader indication (ESI) field representing whether the extended subheader has been allocated, a subheader indicator field, and a flow ID field. Also, the GMH may further include a reserved (Rsv) field. In the GMH of FIG. 20(a), a number in a parenthesis of each field is a bit unit to represent a size of the corresponding field. The GMH may have a size of a total of 2 bytes.

Referring to FIG. 20(b), the GMH can include one or more of a header type (HT) field representing a type of the GMH, an encryption control (EC) field representing whether the MAC PDU has been encrypted, and a flow ID field. Also, the GMH may further include a reserved (Rsv) field. In FIG. 20(b), the GMH may have a size of a total of 1 byte, and the size of each field may be varied within the range of a total of 1 byte.

Referring to FIG. 20(c), the GMH can include one or more of a header type (HT) field representing a type of the GMH, an encryption control (EC) field representing whether the MAC PDU has been encrypted, an encryption key sequence (EKS) field for encrypting the MAC PDU, and a flow ID field. In FIG. 20(c), the GMH may have a size of a total of 1 byte.

Figure 21:
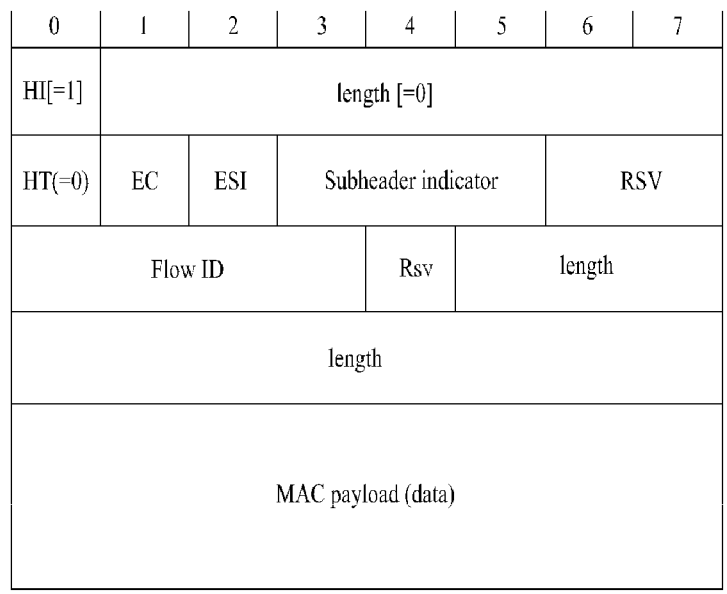
FIG. 21 is a diagram illustrating an example of a MAC PDU structure that uses a CMH structure of FIG. 15, in accordance with still another embodiment of the present invention.

FIG. 21 is a diagram illustrating an example of a MAC PDU structure that uses a CMH structure of FIG. 15, in accordance with still another embodiment of the present invention.

Moreover, FIG. 21 illustrates an example of a MAC PDU structure that can be used if a large sized MAC PDU is transmitted to a resource region allocated by PRA or GRA. In other words, if the length field of the CMH fails to represent the size of the MAC PDU, the length field of the CMH is set to '0', and the length field of the GMH suffixed to the CMH can represent the size of the MAC PDU.

In FIG. 21, since each field included in the MAC PDU is defined in the same manner as above or similarly to the above, the repeated description will be omitted.

Figure 22:
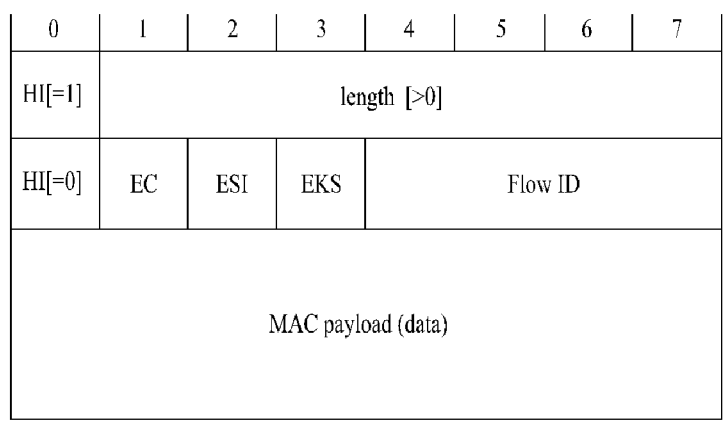
FIG. 22 is a diagram illustrating another example of a MAC PDU structure that uses a CMH structure of FIG. 15, in accordance with still another embodiment of the present invention.

FIG. 22 is a diagram illustrating another example of a MAC PDU structure that uses a CMH structure of FIG. 15, in accordance with still another embodiment of the present invention.

Moreover, FIG. 22 illustrates an example of a MAC PDU structure that can be used if a small sized MAC PDU is transmitted to a resource region allocated by PRA or GRA. In other words, if the length field of the CMH can represent the size of the MAC PDU, the length field of the CMH can represent the size of the MAC PDU. At this time, the GMH having no length field can be suffixed to the CMH. In still another embodiment of the present invention, the third type of the GMH structures having no length field can be used.

FIG. 23 is a diagram illustrating still another example of a MAC PDU structure that uses a CMH structure of FIG. 15, in accordance with still another embodiment of the present invention.

Moreover, FIG. 23 discloses a MAC PDU structure for transmitting a generic MAC PDU through a resource region allocated by PRA or GRA. In other words, the MAC PDU can include a compressed MAC header (CMH) and a signaling header. At this time, the length field of the CMH can represent the size of the MAC PDU (CMH+SMH).

FIG. 24 is a diagram illustrating still another example of a compressed header (CMH) structure that can be used in the embodiments of the present invention.

Referring to FIG. 24, the CMH can include a header indicator (HI) field, an extended subheader indicator (ESI) field, and a length field. At this time, each of the HI field and the ESI field can have a size of 1 bit, and the length field can have a size of 6 bits. In other words, it is preferable that the CMH has a size of a total of 1 byte. The contents represented by the respective fields are the same as aforementioned.

FIG. 25 is a diagram illustrating still another example of a compressed header (CMH) structure that can be used in the embodiments of the present invention.

Referring to FIG. 25, the CMH can include a header type (HT) field, an encryption key sequence (EKS) field, and a length field. At this time, each of the HI field and the ESI field can have a size of 1 bit, and the length field can have a size of 6 bits. In other words, it is preferable that the CMH has a size of a total of 1 byte. The contents represented by the respective fields are the same as aforementioned.

FIG. 26 is a diagram illustrating still another example of a generic MAC header (GMH) structure that can be used in the embodiments of the present invention.

Moreover, FIG. 26 illustrates a GMH structure when the GMH and the CMH take a common type. In other words, in FIG. 26, a CH field representing whether the corresponding header is a compressed MAC header is added to the GMH structure of FIG. 18. The CH field may have a size of 1 bit.

In FIG. 26, the HT field represents whether the MAC header is the GMH or signaling header, and the CH field represents whether the MAC header is the compressed MAC header or generic MAC header.

For example, it is assumed that the MAC header is the signaling header if the HT field is set to '1'. Accordingly, if the HT field is set to '0' and the CH field is set to '0', it represents that the MAC header is the generic MAC header (GMH). If the HT field is set to '1' and the CH field is set to '0', it represents that the MAC header is the signaling header. If the CH field is set to '1', it represents that the MAC header is always the compressed MAC header (CMH).

FIG. 27 is a diagram illustrating still another example of a generic MAC header (GCMH) structure that can be used in the embodiments of the present invention.

If the CH field is set to '1' in FIG. 27, the GMH structure of FIG. 26 can be varied in the same manner as FIG. 27. In other words, the GMH can be configured by a compressed MAC header (CMH) of 1 byte size, which includes a HT field, a CH field and a length field only.

In FIG. 26 and FIG. 27, since the size of VoIP payload is 33 bytes at AMR 12.2 kbps and the size of the compressed IP/UDP/RTP header is 3 bytes, the size of MAC payload of VoIP may be 36 bytes. Accordingly, it is preferable that the length field has a size of 6 bits.

Hereinafter, an extended subheader structure that uses the Ext field described in FIG. 11 to FIG. 14 will be described.

FIG. 28 is a diagram illustrating still another example of an extended sub header (ESH) structure in accordance with still another embodiment of the present invention.

Referring to FIG. 28, the ESH can include a field (for example, No. of ESH) representing a total number of ESHs included in a predetermined MAC PDU, a type field representing a type of the ESH, and an ESH body field that includes actual contents. A number in a parenthesis of each field in FIG. 29 represents a size of each field.

FIG. 29 is a diagram illustrating an example of an extended sub header (ESH) configured in a chain type in accordance with still another embodiment of the present invention.

Referring to FIG. 29, if the ESI field of the GMH is set to 1, the ESH structure is suffixed to the GMH of the MAC PDU (see FIG. 11). If the Ext field of the first ESH (ESH 1) is set to '1', the second ESH (ESH 2) is suffixed to the first ESH. If the Ext field of the second ESH (ESH 2) is set to '1', the third ESH (ESH 3) is suffixed to the second ESH. If the Ext field of the third ESH (ESH 3) is set to '0', the extended subheader is not suffixed to the third ESH any longer. In this case, MAC payload, which includes actual data, is suffixed to the third ESH.

FIG. 30 is a diagram illustrating another example of an extended sub header (ESH) configured in a chain type in accordance with still another embodiment of the present invention.

The ESH of FIG. 30 can be configured by the fields described in FIG. 28 and FIG. 29. In other words, if the ESI field of the GMH is set to '1', the ESH structure defined in FIG. 29 is suffixed to the GMH. A field (No. of ESH) representing the number of ESHs included in the corresponding MAC PDU can be set to '3'. Namely, it represents that the number of ESHs included in the corresponding MAC PDU is 3 (ESH 1, ESH 2 and ESH 3). In FIG. 30, each ESH can include an extended subheader type field and an extended subheader body field.

Figure 31:
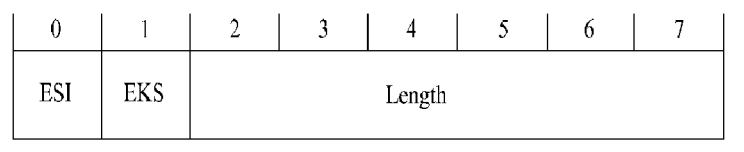

FIG. 31 is a diagram illustrating still another example of a compressed MAC header (CMH) structure in accordance with still another embodiment of the present invention.

Referring to FIG. 31, the CMH can include an extended subheader indicator (ESI) field, an encryption key sequence (EKS) field, and a length field. At this time, each of the ESI field and the EKS field can have a size of 1 bit, and the length field can have a size of 6 bits. In other words, it is preferable that the CMH has a size of a total of 1 byte. The contents represented by the respective fields are the same as aforementioned.

The CMH and/or MAC header structure described in FIG. 10 to FIG. 31 can be applied to the embodiments of the present invention described in FIG. 6 to FIG. 9.

Figure 32:
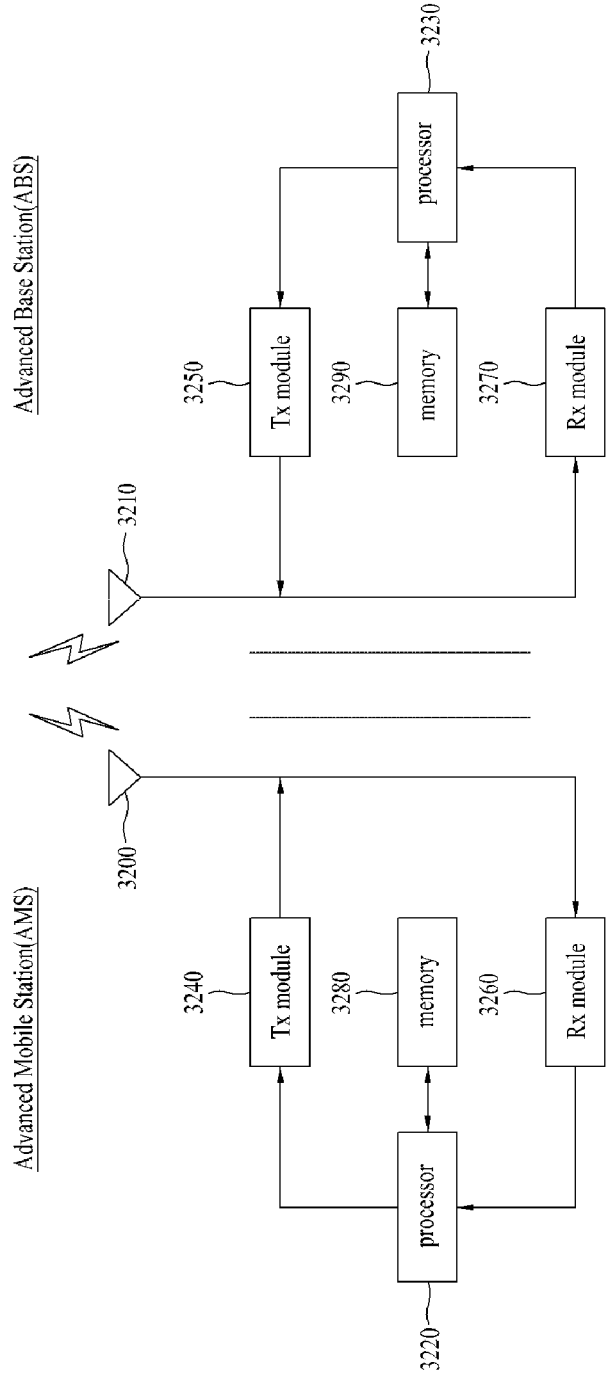
FIG. 32 is a diagram illustrating a mobile station and a base station to which the embodiments of the present invention described in FIG. 1 to FIG. 31 can be applied.

FIG. 32 is a diagram illustrating a mobile station and a base station to which the embodiments of the present invention described in FIG. 1 to FIG. 31 can be applied.

The mobile station is operated as a transmitter in the uplink, whereas the mobile station is operated as a receiver in the downlink. Also, the base station is operated as a receiver in the uplink, whereas the base station is operated as a transmitter in the downlink.

In other words, each of the mobile station and the base station can include a transmitting module (Tx module) 3240, 3250 and a receiving module (Rx module) 3250, 3270 for controlling transmission and reception of information, data and/or message, and an antenna 3200, 3210 for transmitting and receiving information, data and/or message. Also, each of the mobile station and the base station can include a processor 3220, 3230 for performing the aforementioned embodiments of the present invention, and a memory 3280, 3290 for temporarily or persistently storing process steps of the processor.

In particular, the processor 3220, 3230 can include a service support module for supporting the persistent allocation (PA) method and the group allocation (GA) method disclosed in the embodiments of the present invention. In other words, the processor of the mobile station and/or the base station can provide VoIP service, which is one of services of the PA method, by using the service support module. Also, for application of the PA method, the processor of the mobile station and/or the base station can generate and decode the MAC PDU, which includes a CMH.

The Tx module and the Rx module included in the mobile station and the base station can perform a packet modulation and demodulation function for data transmission, a quick packet channel coding function, an orthogonal frequency division multiple access (OFDMA) packet scheduling, time division duplex (TDD) packet scheduling and channel multiplexing function.

Also, the processor included in the mobile station and the base station can perform an encryption control function controlling encryption of management messages (control signal, etc.), a handover function, an authentication and encryption function, a medium access control (MAC) frame variable control function based on service characteristics and radio wave condition, a quick traffic real-time control function and/or a real-time modem control function.

The apparatus described in FIG. 32 is a means or module for which the methods described in FIG. 1 to FIG. 31 can be carried out. The embodiments of the present invention can be performed using the modules and functions of the mobile station and the base station as above.

The processor 3220 included in the mobile station can include an encryption module that can control encryption of a management message. The mobile station can perform an encryption operation using the encryption module.

Also, the mobile station can identify the resource allocation region to which the PA method is applied, by receiving the DL PA MAP IE and/or UL PA MAP IE from the base station through the Rx module 3260.

The processor of the mobile station can receive or transmit downlink VoIP data or uplink VoIP data in or to the base station through the downlink resource region or the uplink resource region represented by the resource allocation region by controlling the Rx module or the Tx module.

At this time, the compressed MAC header can be included in the MAC PDU (for example, downlink VoIP data or uplink VoIP data). The extended header indicator field representing whether the extended header (EH) is included in the corresponding MAC PDU and the length field representing the size of the corresponding MAC PDU can further be included in the compressed MAC header.

In the mean time, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone. Also, examples of the mobile station further include a hand-held PC, a notebook PC, a smart phone, and a multi mode-multi band (MM-MB) terminal.

In this case, the smart phone is a terminal provided with advantages of a mobile communication terminal and a PDA. The smart phone may mean a terminal in which a schedule management function of a PDA and data communication functions of facsimile transmission/reception, internet access, etc. are integrated on a mobile communication terminal. Also, the multimode-multiband terminal means a terminal having a built-in multi-MODEM chip to be operable in a portable internet system and other mobile communication systems (e.g., CDMA (code division multiple access) 2000 system, WCDMA (wideband CDMA) system, etc.).

The embodiments according to the present invention can be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described as above. For example, a software code may be stored in a memory unit 3280, 3290 and then may be driven by a processor 3220, 3230. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The embodiments of the present invention can be applied to various wireless access systems. Examples of the various wireless access systems include 3GPP(3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

What is claimed is:

1. A method for receiving data wherein a mobile station uses a persistent allocation (PA) mode, the method comprising:
    receiving a downlink persistent allocation MAP information element (DL PA MAP IE) from a base station, the DL PA MAP IE including information relating to a resource region allocated for the persistent allocation mode in a downlink; and
    receiving a MAC PDU (Media Access Control Protocol Data Unit) containing a compact medium access control header (CMH) via said resource region,
    wherein the CMH includes an indicator indicating whether or not an extended header exists in the MAC PDU and a length field indicating a length of the MAC PDU,
    the extended header includes an extended header type information and an extended header body, the extended header has a variable length that is determined by the extended header type information, and if the extended header exists, the length field indicates the length of the MAC PDU including the extended header,
    wherein the indicator indicates that the extended header is suffixed to the CMH if the indicator is set to a first value and the indicator indicates that the extended header is not suffixed to the CMH if the indicator is set to a value different from the first value.

2. The method of claim 1, wherein the MAC PDU is received using a hybrid automatic repeat request (HARQ).

3. The method of claim 1, further comprising transmitting an acknowledgment signal to the base station in response to successful reception of the downlink persistent allocation map information element.

4. The method of claim 1, wherein the MAC PDU is Voice over Internet Protocol (VoIP) data.

5. The method of claim 1, wherein the downlink persistent allocation map information element further includes a flow identifier for identifying the MAC PDU, the MAC PDU being transmitted with a fixed size at a predetermined cycle.

6. A method for transmitting data wherein a mobile station uses a persistent allocation (PA) mode, the method comprising:
- receiving an uplink persistent allocation MAP information element (UL PA MAP IE) from a base station, the UL PA MAP IE including information relating to a resource region allocated for the persistent allocation mode in an uplink; and
- transmitting a MAC PDU (Media Access Control Protocol Data Unit) containing a compact medium access control header (CMH) via said resource region,
- wherein the CMH includes an indicator indicating whether or not an extended header exists in the MAC PDU and a length field indicating a length of the MAC PDU,
- the extended header includes an extended header type information and an extended header body, the extended header has a variable length that is determined by the extended header type information, and if the extended header exists, the length field indicates the length of the MAC PDU including the extended header,
- wherein the indicator indicates that the extended header is suffixed to the CMH if the indicator is set to a first value and the indicator indicates that the extended header is not suffixed to the CMH if the indicator is set to a value different from the first value.

7. The method of claim 6, wherein the MAC PDU is transmitted using a hybrid automatic repeat request (HARQ).

8. The method of claim 6, wherein the base station recognizes that the mobile station normally receives the uplink persistent allocation map information element if the MAC PDU is received through the uplink resource region.

9. The method of claim 6, wherein the uplink persistent allocation map information element (UL PA MAP IE) further includes a flow identifier for identifying the MAC PDU, the MAC PDU being transmitted with a fixed size at a predetermined cycle.

10. The method of claim 6, wherein the MAC PDU is Voice over Internet Protocol (VoIP) data.

11. A method for transmitting data wherein a base station uses a persistent allocation (PA) mode, the method comprising:
- transmitting a downlink persistent allocation MAP information element (DL PA MAP IE) to a mobile station, the DL PA MAP IE including information relating to a resource region allocated for the persistent allocation mode in a downlink; and
- transmitting a MAC PDU (Media Access Control Protocol Data Unit) containing a compact medium access control header (CMH) to the mobile station via said resource region,
- wherein the CMH includes an indicator indicating whether or not an extended header exists in the MAC PDU and a length field indicating a length of the MAC PDU,
- the extended header includes an extended header type information and an extended header body, the extended header has a variable length that is determined by the extended header type information, and if the extended header exists, the length field indicates the length of the MAC PDU including the extended header,
- wherein the indicator indicates that the extended header is suffixed to the CMH if the indicator is set to a first value and the indicator indicates that the extended header is not suffixed to the CMH if the indicator is set to a value different from the first value.

12. The method of claim 11, wherein the MAC PDU is transmitted using a hybrid automatic repeat request (HARQ).

13. The method of claim 11, further comprising receiving an acknowledgment signal from the mobile station in response to successful reception of the downlink persistent allocation map information element.

14. The method of claim 11, wherein the downlink persistent allocation map information element (DL PA MAP IE) further includes a flow identifier for identifying the MAC PDU, the MAC PDU being transmitted with a fixed size at a predetermined cycle.

15. The method of claim 11, wherein the MAC PDU is Voice over Internet Protocol (VoIP) data.

16. A method for receiving data wherein a base station uses a persistent allocation (PA) mode, the method comprising:
- transmitting an uplink persistent allocation MAP information element (UL PA MAP IE) to a mobile station, the UL PA MAP IE including information relating to a resource region allocated for the persistent allocation mode in an uplink; and
- receiving a MAC PDU (Media Access Control Protocol Data Unit) containing a compact medium access control header (CMH) via said resource region,
- wherein the CMH includes an indicator indicating whether or not an extended header exists in the MAC PDU and a length field indicating a length of the MAC PDU,
- the extended header includes an extended header type information and an extended header body,
- the extended header has a variable length that is determined by the extended header type information, and if the extended header exists, the length field indicates the length of the MAC PDU including the extended header,
- wherein the indicator indicates that the extended header is suffixed to the CMH if the indicator is set to a first value and the indicator indicates that the extended header is not suffixed to the CMH if the indicator is set to a value different from the first value.

17. The method of claim 16, wherein the MAC PDU is transmitted using a hybrid automatic repeat request (HARQ).

18. The method of claim 16, wherein the base station recognizes that the mobile station normally receives the uplink persistent allocation map information element if the MAC PDU is received through the uplink resource region.

19. The method of claim 16, wherein the uplink persistent allocation map information element (UL PA MAP IE) further includes a flow identifier for identifying the MAC PDU, the MAC PDU being transmitted with a fixed size at a predetermined cycle.

20. The method of claim 16, wherein the MAC PDU is Voice over Internet Protocol (VoIP) data.

21. A mobile station for transmitting and receiving data using a persistent allocation (PA) mode, the mobile station comprising:
- a receiver configured to receive one or more of data and map information element to which the persistent allocation mode is applied;
- a transmitter configured to transmit data to which the persistent allocation mode is applied; and
- a processor configured to control a scheduling service to which the persistent allocation mode is applied,
- wherein the processor is further configured to
  - receive a persistent allocation MAP information element (PA MAP IE) from a base station, the PA MAP IE including information relating to a resource region allocated for the persistent allocation mode; and
  - transmit a MAC PDU (Media Access Control Protocol Data Unit) containing a compact medium access control header (CMH) via said resource region, and wherein the CMH includes an indicator indicating whether or not an extended header exists in the MAC PDU and a length field indicating a length of the MAC PDU, the extended header includes an extended header type information and an extended header body, the extended header has a variable length that is determined by the extended header type information, and if the extended header exists, the length field indicates the length of the MAC PDU including the extended header, wherein the indicator indicates that the extended header is suffixed to the CMH if the indicator is set to a first value and the indicator indicates that the extended header is not suffixed to the CMH if the indicator is set to a value different from the first value.

22. The mobile station of claim 21, wherein the MAC PDU is transmitted using a hybrid automatic repeat request (HARQ).

23. The mobile station of claim 21, wherein the processor further performs transmitting an acknowledgment signal to the base station in response to successful reception of the persistent allocation map information element.

24. The mobile station of claim 21, wherein the MAC PDU is Voice over Internet Protocol (VoIP) data.

25. The mobile station of claim 21, wherein the persistent allocation map information element (PA MAP IE) further includes a flow identifier for identifying the MAC PDU, the MAC PDU being transmitted with a fixed size at a predetermined cycle.

* * * * *